(12) United States Patent
Matsuoka et al.

(10) Patent No.: US 8,045,815 B2
(45) Date of Patent: Oct. 25, 2011

(54) IMAGE ENCODING APPARATUS AND IMAGE ENCODING METHOD

(75) Inventors: Masaaki Matsuoka, Yokohama (JP); Masato Kosugi, Yokohama (JP); Yuuichirou Kimijima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 11/912,938

(22) PCT Filed: Aug. 25, 2006

(86) PCT No.: PCT/JP2006/317293
§ 371 (c)(1), (2), (4) Date: Oct. 29, 2007

(87) PCT Pub. No.: WO2007/026855
PCT Pub. Date: Mar. 8, 2007

(65) Prior Publication Data
US 2009/0086817 A1      Apr. 2, 2009

(30) Foreign Application Priority Data

Sep. 2, 2005 (JP) ................................. 2005-255612
Jul. 19, 2006 (JP) ................................. 2006-197372

(51) Int. Cl.
*G06K 9/36* (2006.01)
(52) U.S. Cl. .................... 382/248; 375/240.18
(58) Field of Classification Search ............. 375/240.18, 375/240.23, 246; 382/232, 234, 246, 248
See application file for complete search history.

(56) References Cited

U.S. PATENT DOCUMENTS

| | | | | |
|---|---|---|---|---|
| 5,832,129 A | * | 11/1998 | Horiuchi et al. | 382/248 |
| 6,075,897 A | | 6/2000 | Kosugi | 382/232 |
| 6,640,019 B2 | | 10/2003 | Kosugi et al. | 382/299 |
| 6,671,418 B2 | | 12/2003 | Rengakuji et al. | 382/264 |
| 6,798,927 B2 | | 9/2004 | Kosugi et al. | 382/299 |
| 7,432,960 B2 | * | 10/2008 | Fukuzawa | 348/222.1 |

FOREIGN PATENT DOCUMENTS

EP        0 762 775 A2     3/1997
(Continued)

OTHER PUBLICATIONS

Okada, S., et al., "System on a Chip for Digital Still Camera", IEEE Transactions on Consumer Electronics, vol. 45, No. 3, Aug. 1999, pp. 584-590.

*Primary Examiner* — Brenda H Pham
(74) *Attorney, Agent, or Firm* — Fitzpatrick, Cella, Harper & Scinto

(57) ABSTRACT

An image capturing apparatus 100 first executes JPEG encoding on RAW data. On the basis of the compression ratio of JPEG image data obtained, the image capturing apparatus 100 selects a Huffman table to encode the RAW data. With the higher compression ratio of the JPEG data obtained, the image capturing apparatus 100 assumes that the RAW data is image data with a larger number of low frequency components. The image capturing apparatus 100 thus selects a Huffman table that assigns a particularly short code to a predictive differential value with a smaller absolute value. In contrast, with the lower compression ratio of the JPEG image data obtained, the image capturing apparatus 100 selects a Huffman table that assigns a code of a relatively equal length to the predictive differential value regardless of its absolute value.

16 Claims, 9 Drawing Sheets

FOREIGN PATENT DOCUMENTS

| | | |
|---|---|---|
| EP | 1 453 208 A1 | 9/2004 |
| JP | 5-328137 | 12/1993 |
| JP | 6-22152 | 1/1994 |
| JP | 9-233473 | 9/1997 |
| JP | 10-336647 | 12/1998 |
| JP | 10-336682 | 12/1998 |
| JP | 2001-169280 | 6/2001 |
| JP | 2001-326939 | 11/2001 |
| WO | WO 93/19434 | 9/1993 |

* cited by examiner

FIG. 2

| R | G | R | G |
|---|---|---|---|
| G | B | G | B |
| R | G | R | G |
| G | B | G | B |
| R | G | R | G |
| G | B | G | B |
| R | G | R | G |

R : Red
G : Green
B : Blue

IMAGE ENCODING APPARATUS AND IMAGE ENCODING METHOD

TECHNICAL FIELD

The present invention relates to an image encoding apparatus and an image encoding method which encodes image data and stores it in a storage medium.

BACKGROUND ART

Image data acquired via an image sensing device in an image processing apparatus such as a digital camera is subjected to A/D conversion. In many cases, the resulting digital data is then subjected to necessary image processing, and lossy compression such as JPEG encoding is executed on the processed data. The compressed data is stored in a storage medium as JPEG image data. This enables a large number of image data to be efficiently stored in a storage medium having a limited storage capacity.

To focus on image quality, all information obtained via an image sensing device (hereinafter also referred to as "CCD-RAW data") is subjected to lossless compression instead of image processing inside an image processing apparatus such as a digital camera before being stored in a storage medium. The stored image data (hereinafter referred to as "compressed RAW data") is then subjected to image processing using computer software or the like provided by a digital camera manufacturer or the like. Users can then obtain high-quality images. In this case, each compressed RAW data is stored simultaneously with the corresponding JPEG image data. The user can thus check stored images on the fly, save them as they are, or print them out.

To generate compressed RAW data or JPEG image data from CCD-RAW data, a digital camera encodes the CCD-RAW data on the basis of various encode parameters. The encode parameters indicate, for example, the type of a Huffman table for Huffman encoding in the digital camera and the type of a quantization table for quantization. The compression ratio of compressed RAW data or JPEG image data varies depending on the types of encode parameters used. The Huffman table indicates what code is to be assigned to what value.

Many conventional digital cameras efficiently store images in a storage medium by selectively applying a preferred one of plural encode parameters so as to maximize the compression ratio. For example, Japanese Patent Laid-Open No. 2001-326939 proposes a technique for experimentally executing encoding with each of the plural encode parameters held in a storage unit and adopting an encode parameter resulting in the maximum compression ratio.

However, the conventional technique in Japanese Patent Laid-Open No. 2001-326939 must experimentally execute encoding with all of the plural encode parameters held in the storage unit, thus increasing the time required to process each image data. This disadvantageously degrades the response of the apparatus and reduces the continuous shooting speed and continuous shooting frame count.

The present invention is made in view of these circumstances and is characterized by providing a technique for quickly selecting an encode parameter for an image encoding apparatus which achieves high compression efficiency.

DISCLOSURE OF INVENTION

It is a feature of the present invention to solve the conventional problems.

According to an aspect of the present invention, there is provided with an image encoding apparatus which executes compression encoding on image data to generate encoded data and which stores the encoded data in a memory, the apparatus comprising:

first compression encoding means for executing compression encoding on the image data by a first compression scheme;

second compression encoding means for executing compression encoding on the image data by a second compression scheme using an encode parameter;

storage means for holding a plurality of the encode parameters; and encode parameter selection means for selecting, on a basis of a result of the compression by the first compression encoding means, one of the plurality of encode parameters held in the storage means which is used to allow the second encoding means to encode the image data.

According to another aspect of the present invention, there is provided with an image encoding apparatus which executes compression encoding on image data to generate encoded data and which stores the encoded data in a memory, the apparatus comprising:

first compression encoding means for executing compression encoding on resized image data by a first compression scheme, the resized image data being obtained by resizing the image data;

second compression encoding means for executing compression encoding on the image data by a second compression scheme using an encode parameter;

storage means for holding a plurality of the encode parameters; and encode parameter selection means for selecting, on the basis of a result of the compression by the first compression encoding means, one of the plurality of encode parameters held in the storage means which is used to allow the second encoding means to encode the image data.

According to another aspect of the present invention, there is provided with an image encoding method which executes compression encoding on image data to generate encoded data and which stores the encoded data in a memory, the method comprising:

a first compression encoding step of executing compression encoding on the image data by a first compression scheme;

a second compression encoding step of executing compression encoding on the image data by a second compression scheme using an encode parameter; and an encode parameter selecting step of selecting, on the basis of a result of the compression by the first compression encoding means, one of the plurality of encode parameters held in storage means which is used to encode the image data in the second encoding step.

According to another aspect of the present invention, there is provided with an image encoding method which executes compression encoding on image data to generate encoded data and which stores the encoded data in a memory, the method comprising:

a first compression encoding step of executing compression encoding on resized image data by a first compression scheme, the resized image data being obtained by resizing the image data;

a second compression encoding step of executing compression encoding on the image data by a second compression scheme using an encode parameter; and an encode parameter selecting step of selecting, on the basis of a result of the compression in the first compression encoding step, one of the plurality of encode parameters held in storage means which is used to encode the image data in the second encoding step.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a diagram showing a color filter arrangement in an image sensing device;

BEST MODE FOR CARRYING OUT THE INVENTION

The present invention will be described below in detail in conjunction with its preferred embodiments, with reference to the accompanying drawings.

First Embodiment

In a first embodiment, description will be given of a technique in which an image capturing apparatus selects an encode parameter for generating compressed RAW data, on the basis of the compression ratio of JPEG image data.

Figure 1:
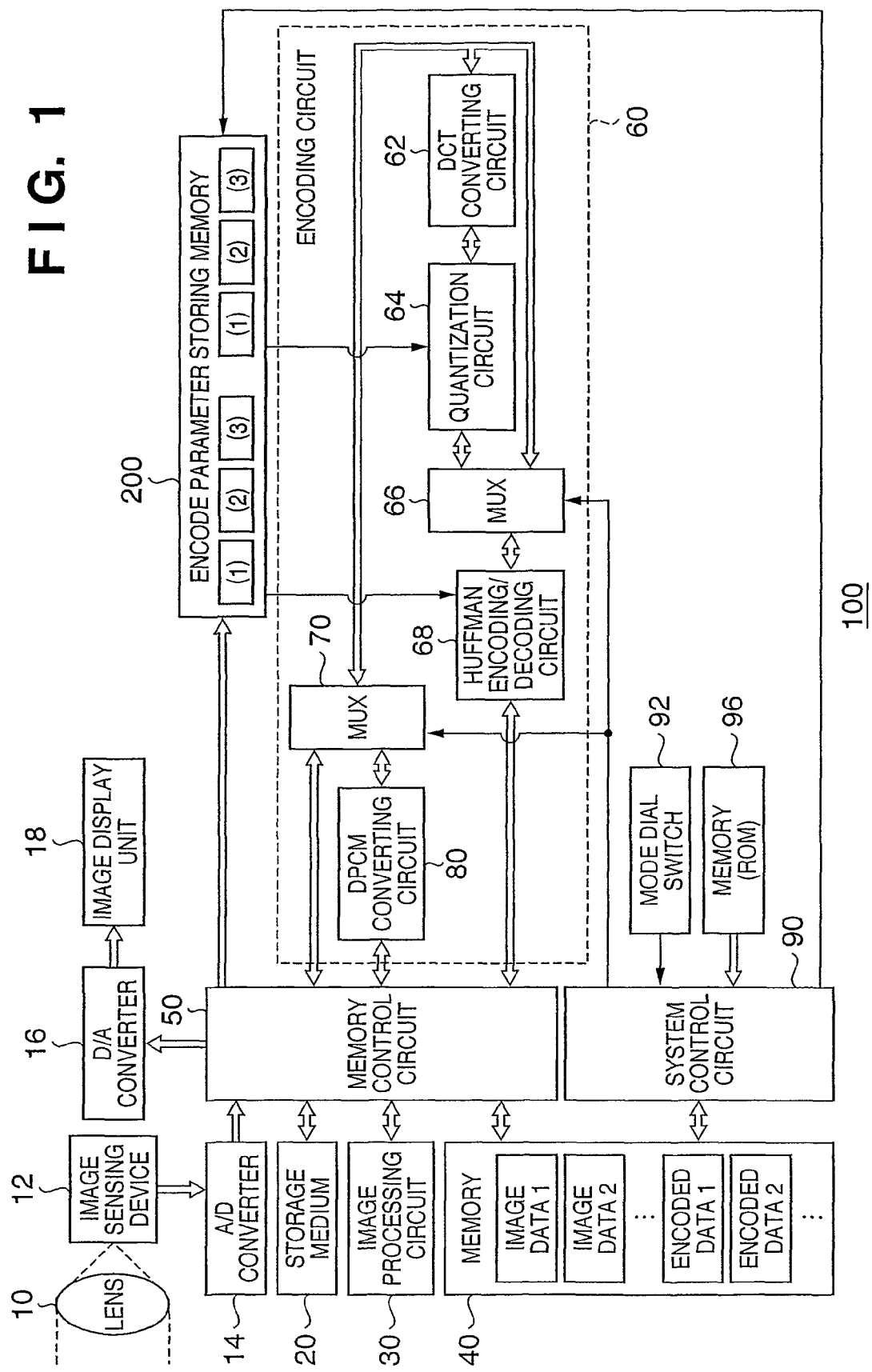
FIG. 1 is a schematic diagram of an image capturing apparatus according to an embodiment of the present invention.

FIG. 1 is a diagram showing the general configuration of an image capturing apparatus used in the present embodiment as an image processing apparatus having the functions of both an image encoding and decoding apparatuses. With reference to FIG. 1, description will be given of lossless compression and storage of an image executed in an image capturing apparatus 100 using a Huffman encoding and decoding circuit in an encoding circuit without carrying out image processing on image data obtained by an image sensing device. JPEG images associated with RAW data and stored simultaneously are obtained by executing a predetermined process on image data obtained by the image sensing device and allowing the encoding circuit to subject the processed image data to lossy compression. Navigating the simultaneously stored JPEG images enables the contents of the images to be quickly understood without developing the RAW data.

Reference numeral 10 denotes an image capturing lens that optically forms a captured image. Reference numeral 12 denotes an image sensing device (CCD) that converts the captured image into an analog electric signal. Reference numeral 14 denotes an A/D converter that converts an analog signal output from the image sensing device 12 into a digital signal. Here, digital data output by the A/D converter 14 is hereinafter referred to as CCD-RAW data. The image sensing device may be a CMOS or the like, which similarly provides RAW data.

Reference numeral 16 denotes a D/A converter and reference numeral 18 denotes an image display unit consisting of a TFT LCD or the like. Display image data written to a memory 40 is converted from digital data into analog data via the D/A converter 16. The resulting analog data is displayed on the image display unit 18.

Reference numeral 20 denotes a storage medium such as a memory or a hard disk in which captured image data or the like is stored.

Reference numeral 30 denotes an image processing circuit that executes a predetermined developing process such as pixel interpolating processing or color converting processing, or resize processing on captured or stored CCD-RAW data.

Reference numeral 40 denotes a memory that temporarily stores captured image data and that has a sufficient storage capacity to store a predetermined number of still images or a predetermined time worth of motion pictures. For example, digital image data output by the A/D converter 14 is written to the memory 40 via a memory control circuit 50 and the image processing circuit 30 or directly via the memory control circuit 50.

Reference numeral 50 denotes the memory control circuit that controls data flows to the A/D converter 14, D/A converter 16, storage medium 20, image processing circuit 30, and memory 40, as well as a DPCM converting circuit 80 and an encoding circuit 60.

Reference numeral 60 denotes an encoding circuit that compresses and decompresses image data and that is composed of a DCT converting circuit 62, a quantization circuit 64, a MUX (data selector) 66, and a Huffman encoding and decoding circuit 68. The data selector 66 switches between JPEG encoding/decoding and the lossless compression/decompression of CCD-RAW data.

Reference numeral 70 denotes a MUX (data selector) that switches between JPEG encoding/decoding and the lossless compression/decompression of CCD-RAW data.

Reference numeral 80 denotes a circuit that executes DPCM conversion on CCD-RAW data so that the Huffman encoding and decoding circuit 68 in the encoding circuit 60 can be used to subject CCD-RAW data to lossless compression and decompression. The DPCM converting circuit 80 executes DPCM conversion (predictive encoding) on CCD-RAW data in order to reduce the entropy of an information source to increase the encoding efficiency of the Huffman encoding. The DPCM converting circuit 80 executes, for example, DPCM conversion (predictive encoding) on 10-bit CCD-RAW data and inverse DPCM conversion on 11-bit DPCM data.

The DPCM conversion makes use of the close correlation between neighboring pixels in image information, thus converts the image information into the differential value between pixel data on a pixel to be encoded and pixel data on an adjacent pixel (pixel on the left of the pixel to be encoded). This reduces the entropy of the information source to increase the encoding efficiency of the Huffman encoding. The present embodiment uses such a CCD color filter arrangement as shown in FIG. 2 thus always calculates the differential value between data on a target pixel and data on the third pixel from the target pixel on the left. The DPCM converting circuit 80 is thus configured to determine the differential between newly input CCD-RAW data and the CCD-RAW data input before the last but one.

Reference numeral 90 denotes a system control circuit that controls the operations of the entire image capturing apparatus 100 and of the circuits constituting the image capturing apparatus 100 in accordance with settings made via a mode dial switch 92 and settings in a ROM 96 (Read Only Memory).

Reference numeral 92 denotes the mode dial switch that enables function modes such as power off, image capturing, and playback to be switched and set.

Reference numeral 96 denotes a read only memory (ROM) that pre-stores programs for the system control circuit 90 and quantization and Huffman tables any of which are to be set in the encoding circuit 60. The quantization tables stored in the ROM 96 are transferred to the memory 40 and then held in an encode parameter storing memory 200 via the memory control circuit 50.

Reference numeral 200 denotes the encode parameter storing memory that stores Huffman tables for the Huffman encoding and decoding circuit 68. The encode parameter storing memory also stores quantization tables for the quantization circuit 64.

Figure 3:
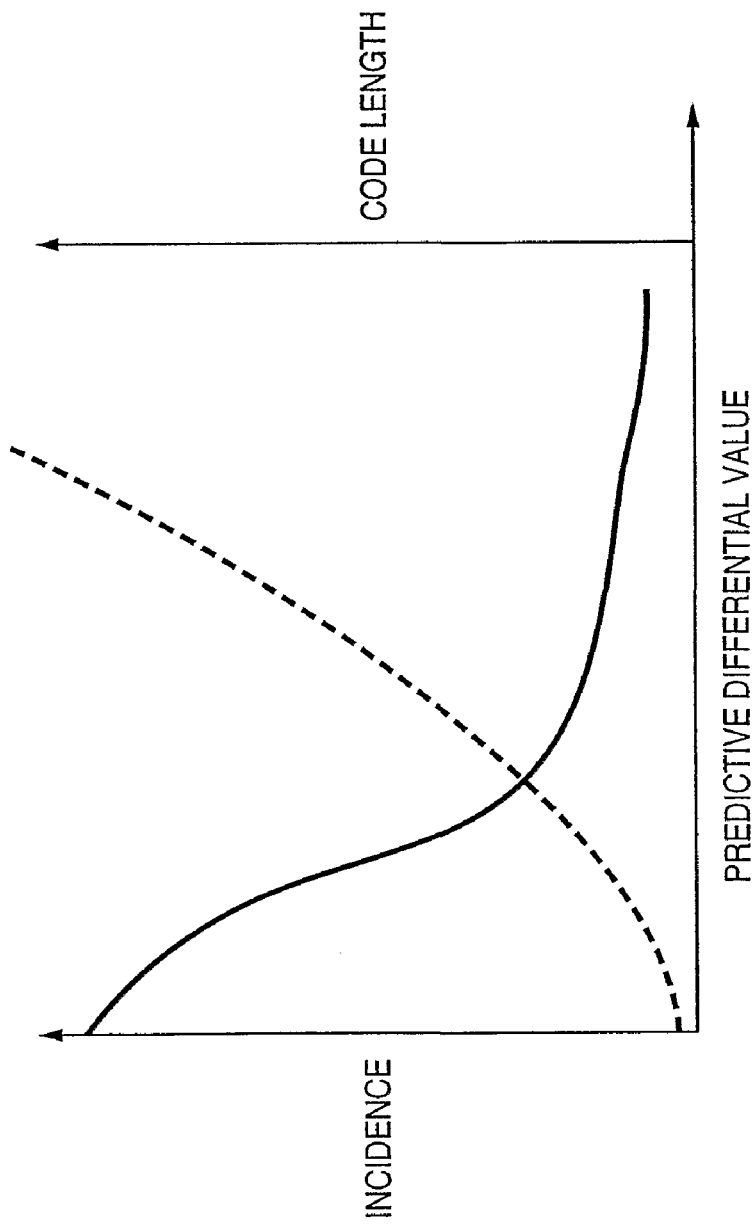
FIG. 3 is a diagram showing the relationship between the nature of DPCM data in Huffman encoding with lossless compression and a Huffman table to be applied.
Figure 4:
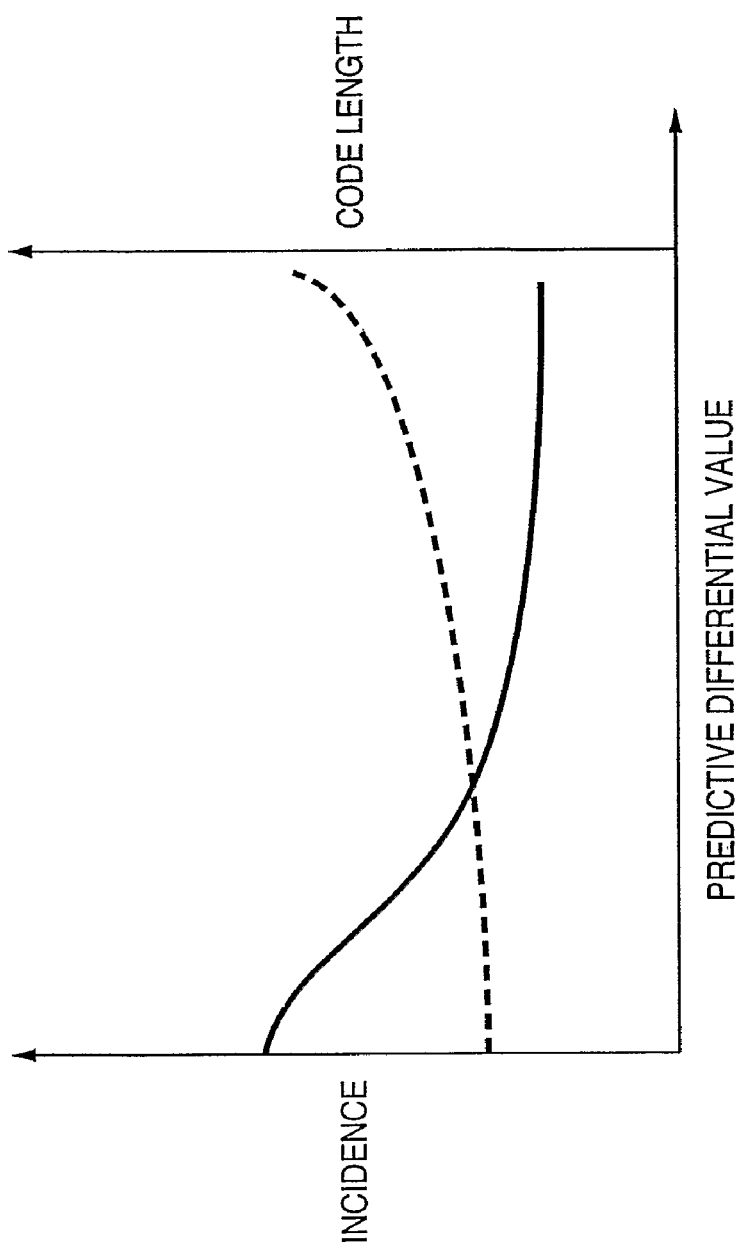
FIG. 4 is a diagram showing the relationship between the nature of DPCM data in Huffman encoding with lossless compression and a Huffman table to be applied.

With reference to FIGS. 3 and 4, description will be given of the relationship between the nature of DPCM data in Huffman encoding with lossless compression and the Huffman table. FIG. 3 is a diagram illustrating that JPEG encoding of image results in a high compression ratio. The axis of abscissa indicates the absolute value of a predictive differential value for DPCM data. The solid line indicates the incidence of absolute value of the predictive differential value. The broken like indicates the code length of the Huffman table. The compression ratio of an image is defined by $\alpha$=(image data size after encoding)/(image data size before encoding).

Image data with a high compression ratio has a significant correlation between pixels. Higher incidences thus concentrate in an area with smaller absolute values of the predictive differential value. The size of Huffman encoding data is thus reduced by using such a Huffman table as assigns a shorter code length to a smaller absolute value of the predictive differential value, while assigning a longer code length to a larger absolute value of the predictive differential value.

FIG. 4 is a diagram illustrating that JPEG encoding of image results in a low compression ratio. Image data exhibiting a low compression ratio after encoding has an insignificant correlation between pixels. The incidence is distributed so as to insignificantly vary from smaller to larger absolute values of the predictive differential value. The size of Huffman encoding data is thus reduced by using such a Huffman table as assigns an insignificantly varying code length to the smaller to larger absolute values of the predictive differential value.

Figure 5:
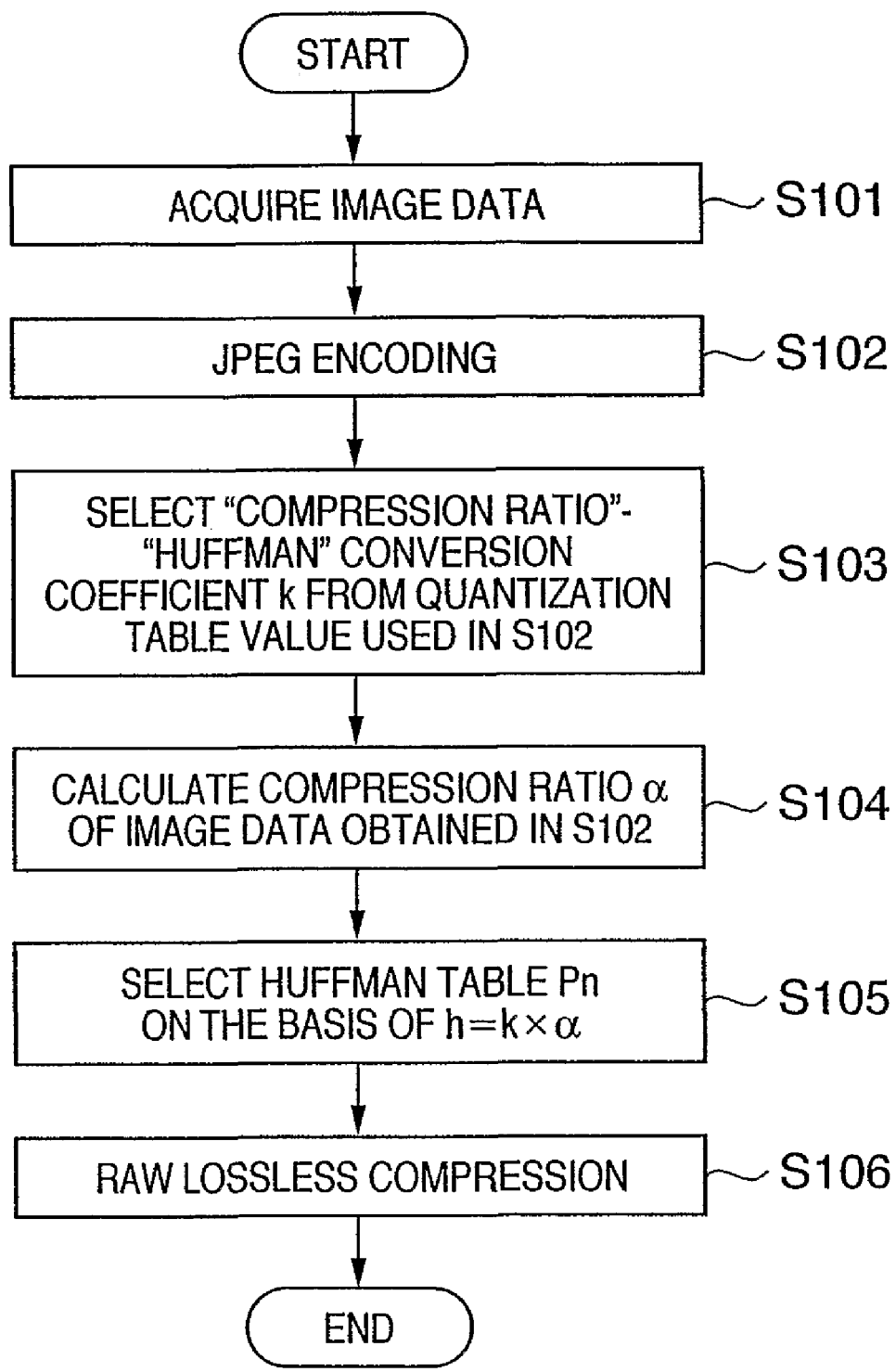
FIG. 5 is a flowchart showing the flow of a process for selecting a Huffman table for RAW lossless compression on the basis of the compression ratio of JPEG image data according to a first embodiment.

With reference to the flowchart in FIG. 5 and graph in FIG. 6, description will be given of a procedure for generating JPEG image data and compressed RAW data from CCD-RAW data according to the first embodiment. Huffman tables are statistically pre-calculated and stored in the ROM 96. The Huffman tables are then transferred to and held in the encode parameter storing memory 200 via the system control circuit 90 and memory 40 as previously described.

First, image data (CCD-RAW data) captured and stored in the memory 40 is acquired by the memory control circuit 50, which then sends the data to the encoding circuit 60 (S101).

At this time, the system control circuit 90 transmits a signal for generation of JPEG image data from CCD-RAW data, to the data selectors 70 and 66. The encoding circuit 60 thus executes a JPEG encoding process via the DCT converting circuit 62, quantization circuit 64, and Huffman encoding and decoding circuit 68. Encoded data (JPEG image data) is stored in the memory 40 via the memory control circuit 50 (S102).

The system control circuit 90 then acquires a quantization table value used for encoding from the JPEG image data generated in S102. The "quantization table value" indicates the magnitude of a quantization step. A larger quantization table value increases the compression ratio of JPEG image data. On the basis of the quantization table value acquired, the system control circuit 90 selects a "compression ratio"–"Huffman" conversion coefficient k (S103). Although described below in detail with reference to FIG. 6, a smaller quantization table value reduces the value k.

The system control circuit 90 then calculates the compression ratio $\alpha$ ((JPEG image data size)/(CCD–RAW data size)) of the JPEG image data generated in S102 (S104).

The system control circuit 90 selects a Huffman table from the encode parameter storing memory 200 on the basis of a Huffman table selection value $h = k \times \alpha$ (S105). This will be described with reference to FIG. 6.

Figure 6:
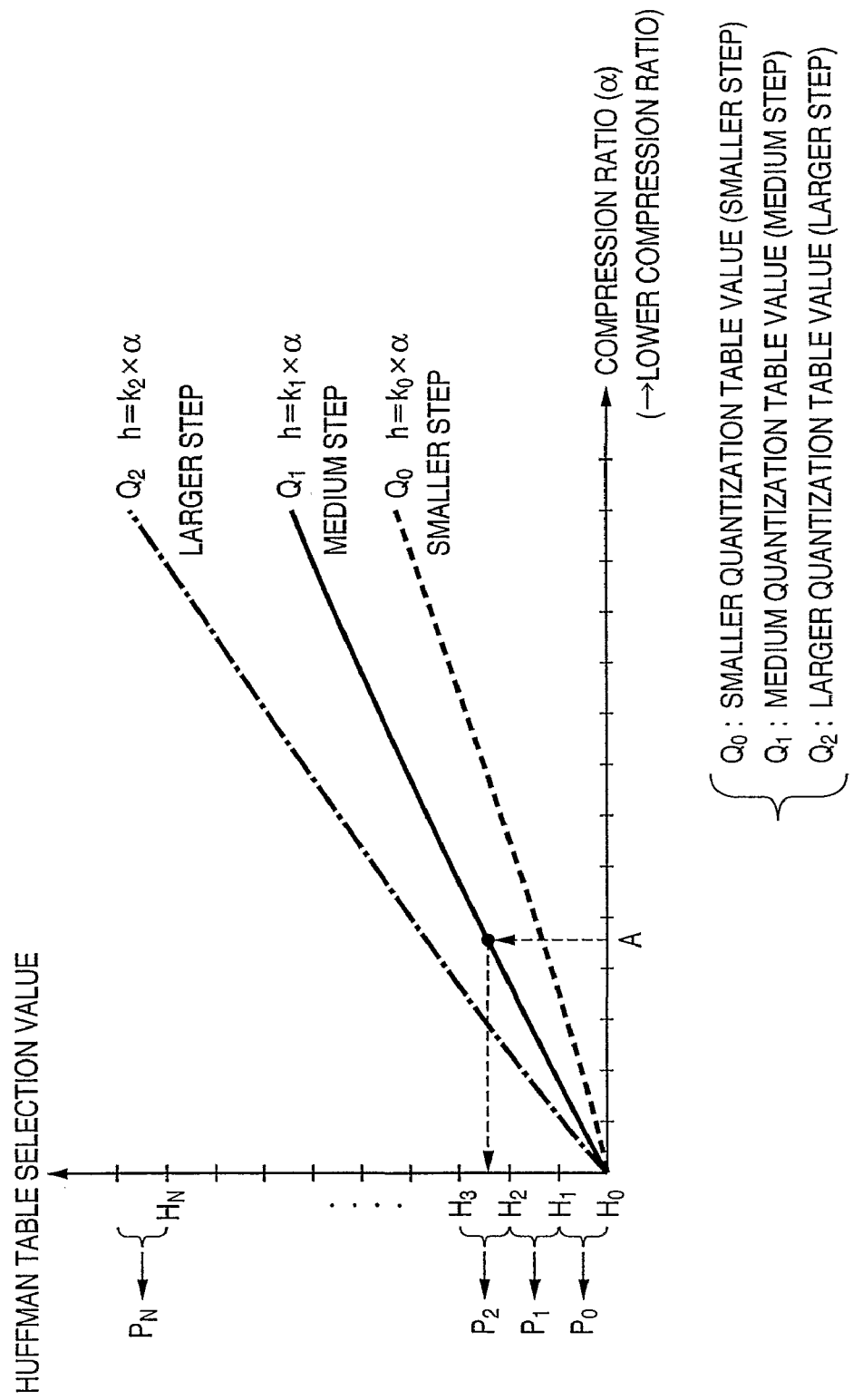
FIG. 6 is a graph that allows a Huffman table to be selected according to a first embodiment.

In the graph in FIG. 6, the axis of abscissa indicates the compression ratio $\alpha$, which becomes lower (value $\alpha$ increases) from left to right on the axis of abscissa. The axis of ordinate indicates the Huffman table selection value h, determined from the compression ratio. The following tendency is more significant from top to bottom of the axis of ordinate: a shorter code length is assigned to a smaller absolute value of the predictive differential value, while a longer code length is assigned to a larger absolute value of the predictive differential value. It is assumed that three quantization tables Q0, Q1, and Q2 are used in S102. Q0 denotes a quantization table with a small quantization step. Q1 denotes a quantization table with a medium quantization step. Q2 denotes a quantization table with a large quantization step.

It is estimated that a higher compression ratio (smaller value $\alpha$) indicates that the CCD-RAW data is image data with a larger number of low frequency components. Thus, to generate compressed RAW data, it is preferable to use a Huffman table that assigns a particularly short code to a predictive differential value with a small absolute value.

However, the compression ratio of JPEG image data varies depending not only on the amount of low frequency components in CCD-RAW data but also on the magnitude of the quantization step. With the same CCD-RAW data, the compression ratio becomes lower (value $\alpha$ increases) with decreasing magnitude of the quantization step. The "compression ratio"–"Huffman" conversion coefficient k is selected on the basis of the quantization table value to calculate the Huffman table selection value h as shown in the graph in FIG. 6.

In FIG. 6, the quantization table is Q1 and the value $\alpha$ is A. Accordingly, the Huffman table selection value is an intermediate value between H2 and H3. A Huffman table P2 is thus selected. H0 to HN in FIG. 6 denote thresholds that allow the Huffman table PN to be selected and that are set at arbitrary intervals. The number of thresholds is also arbitrary. The increased number of thresholds increases the number of Huffman tables one of which can be selected by the system control circuit 90.

The memory control circuit 50 then acquires CCD-RAW data from the RAW memory 40 and sends it to the encoding circuit 60 again, as in the case of S101. The encoding circuit 60 uses the Huffman table selected in S105 to compress the CCD-RAW data to obtain compressed RAW data (S106). At this time, the system control circuit 90 transmits a RAW lossless compression (encoding) signal to the data selectors 70 and 66.

As described above, according to the present embodiment, the image capturing apparatus 100 first executes JPEG encoding on the CCD-RAW data. On the basis of the compression ratio of the JPEG image data obtained, the image capturing apparatus 100 selects a Huffman table to encode the CCD-RAW data. With the higher compression ratio of the JPEG image data obtained, the image capturing apparatus 100 assumes that the CCD-RAW data is image data with a larger number of low frequency components. The image capturing apparatus 100 thus selects a Huffman table that assigns a particularly short code to a predictive differential value with a small absolute value. In contrast, with the lower compression ratio of the JPEG image data obtained, the image capturing apparatus 100 selects a Huffman table that assigns a code of a relatively equal length to the predictive differential value regardless of its absolute value.

Thus, the image capturing apparatus 100 need not repeat trials and errors before determining which Huffman table to use. This in turn makes it possible to relatively efficiently encode image data while quickly selecting a Huffman table.

Even if the operation in S103 is omitted and the same "compression ratio"–"Huffman" conversion coefficient k is used regardless of the quantization table value, the effects of the present embodiment are exerted to some degree.

Second Embodiment

In the first embodiment, the image capturing apparatus 100 selects a Huffman table for RAW lossless compression on the basis of the compression ratio of JPEG image data generated from CCD-RAW data. In a second embodiment, the image capturing apparatus 100 selects a quantization and Huffman tables for JPEG encoding on the basis of the compression ratio of compressed RAW data generated from CCD-RAW data.

Figure 7:
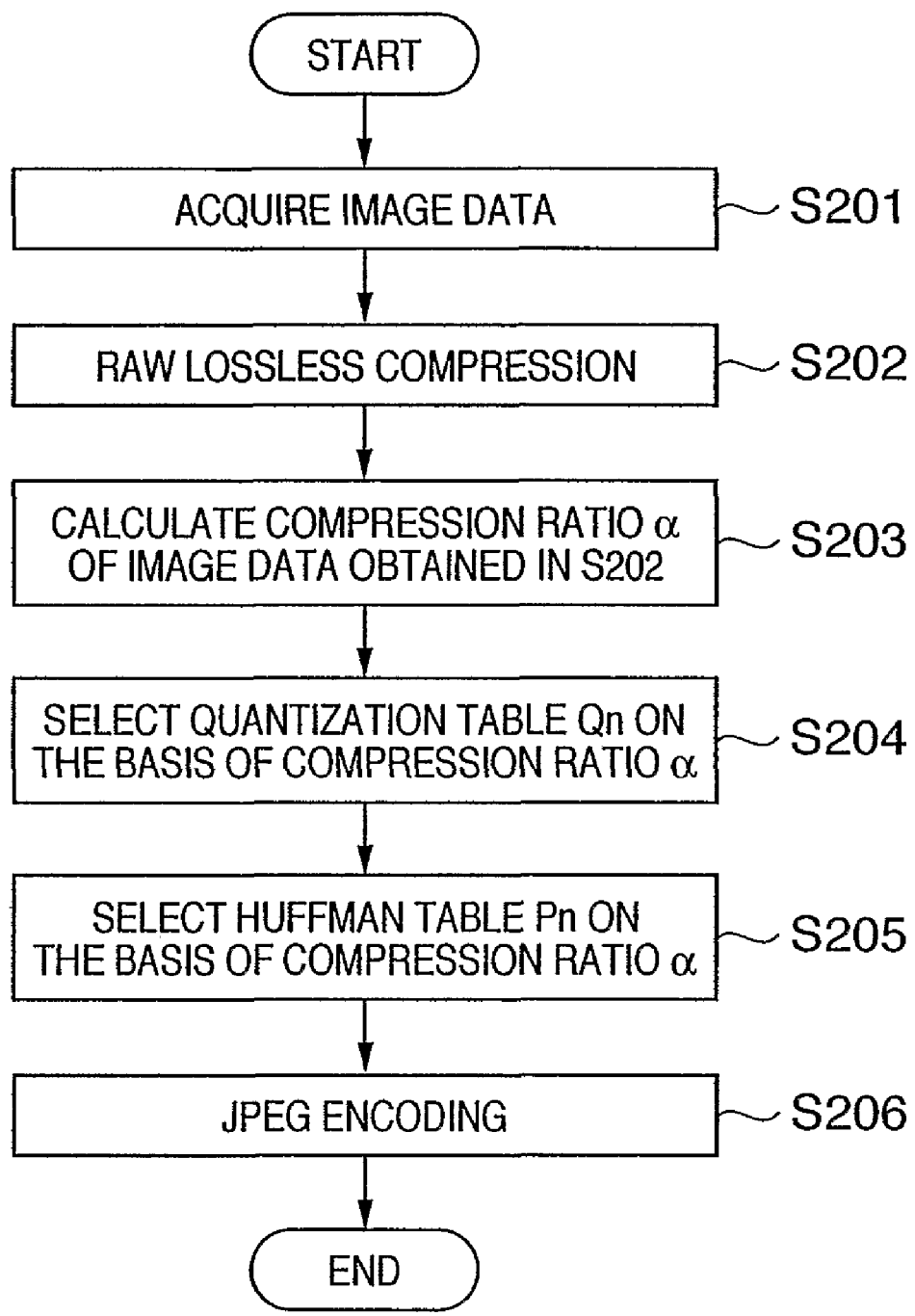
FIG. 7 is a flowchart showing the flow of a process for selecting a quantization table and a Huffman table for JPEG encoding on the basis of the compression ratio of compressed RAW data according to a second embodiment.
Figure 8:
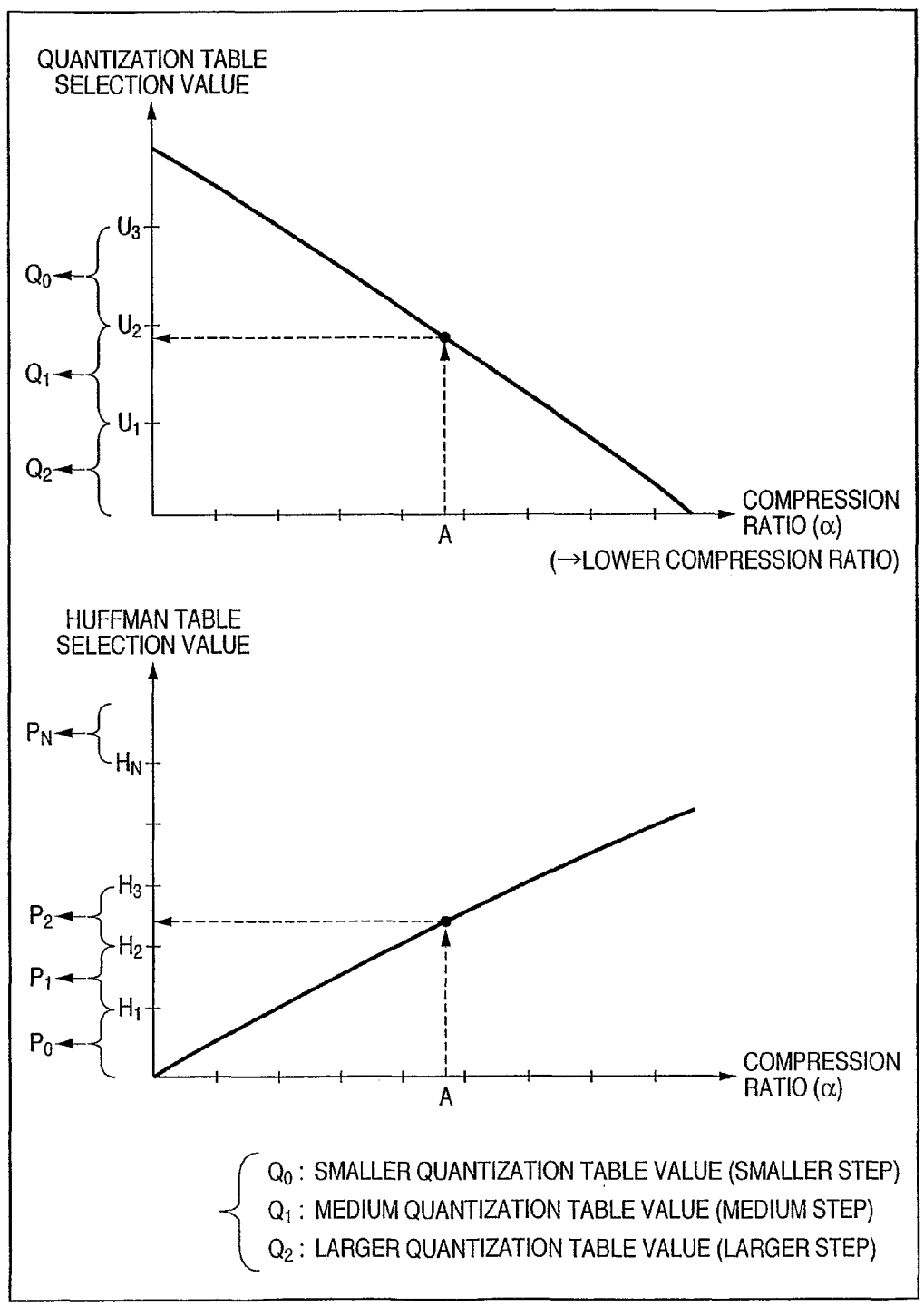
FIG. 8 is a graph that allows a quantization table and a Huffman table to be selected according to a second embodiment.

With reference to the flowchart in FIG. 7 and graph in FIG. 8, description will be given of a procedure for generating compressed RAW data and JPEG image data from CCD-RAW data according to the second embodiment. Quantization and Huffman tables are statistically pre-calculated and stored in the ROM 96. The Huffman tables are then transferred to and held in the encode parameter storing memory 200 via the system control circuit 90 and memory 40.

First, image data (CCD-RAW data) captured and stored in the memory 40 is acquired by the memory control circuit 50, which then sends the data to the encoding circuit 60 (S201).

At this time, the system control circuit 90 transmits a signal for generation of compressed RAW data from CCD-RAW data, to the data selectors 70 and 66. The encoding circuit 60 thus executes a RAW lossless compressing process via the DPCM converting circuit 80 and Huffman encoding and decoding circuit 68. Encoded data (compressed RAW data) is stored in the memory 40 via the memory control circuit 50 (S202).

The system control circuit 90 then calculates the compression ratio α ((compressed RAW data size)/(CCD-RAW data size)) of the compressed RAW data generated in S202 (S203).

The system control circuit 90 then selects a quantization table suitable for generating JPEG images, on the basis of the compression ratio α calculated in S203 (S204). In general, image data with a higher compression ratio exhibits a significant correlation between pixels and contains a large number of low frequency components. Human eyes tend to be more sensitive to noise in image data containing a large number of low frequency components. Thus, for image data with a higher compression ratio, the system control circuit 90 selects a quantization table with a smaller value in order to reduce block noise or the like which may occur during encoding. In contrast, for image data with a lower compression ratio, the system control circuit 90 selects a quantization table with a larger value. FIG. 8 shows a graph in which a quantization table Q2 with a larger quantization step is selected for a lower compression ratio (larger value α) and in which a quantization table Q0 with a smaller quantization step is selected for a higher compression ratio (smaller value α). At the compression ratio α=A, the quantization table selection value is an intermediate value between U1 and U2. A quantization table Q1 is thus selected.

An image having compressed RAW data with a lower compression ratio (larger value α) tends to correspond to JPEG image with a lower compression ratio. A variation in the size of JPEG image data generated can be suppressed by increasing the quantization table value for JPEG encoding for a larger value α, while reducing it for a smaller value α.

The system control circuit 90 then selects a Huffman table suitable for generating a JPEG image on the basis of the compression ratio α calculated in S203 (S205). A method for selecting a Huffman table and the nature of the Huffman tables P0 to PN according to the second embodiment are similar to those according to the first embodiment and will not be described below. In the example shown in FIG. 8, at the compression ratio A, the Huffman table selection value is an intermediate value between H2 and H3. The Huffman table P2 is thus selected.

The memory control circuit 50 then acquires CCD-RAW data from the memory 40 and sends it to the encoding circuit 60 again as is the case with S201. The encoding circuit 60 uses the quantization table selected in S204 and the Huffman table selected in S205 to execute JPEG encoding on the CCD-RAW data to obtain JPEG image data (S206). At this time, the system control circuit 90 transmits a signal for JPEG encoding to the data selectors 70 and 66.

As described above, according to the present embodiment, the image capturing apparatus 100 first subjects CCD-RAW data to RAW lossless compression. On the basis of the compression ratio of the compressed RAW data obtained, the image capturing apparatus 100 selects a quantization and Huffman tables to subject the CCD-RAW data to JPEG encoding.

Thus, the image capturing apparatus 100 need not repeat trials and errors before determining which quantization table and/or Huffman table to use. This makes it possible to relatively efficiently execute JPEG encoding on image data while quickly selecting a quantization table and/or Huffman table.

Third Embodiment

Figure 9:
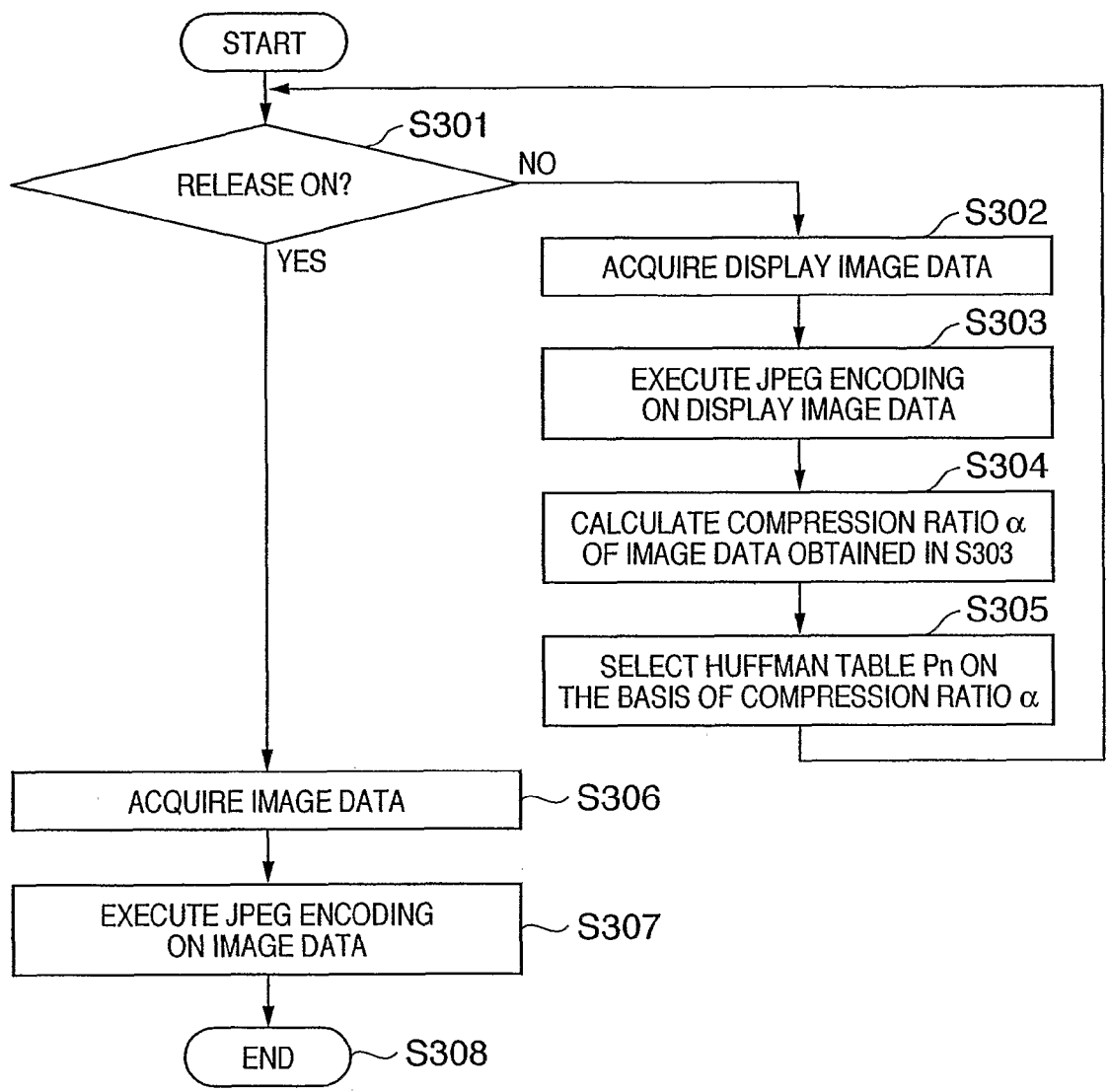
FIG. 9 is a flowchart showing the flow of a process for selecting a Huffman table that allows storing JPEG image data to be generated, on the basis of the compression ratio of JPEG image data generated from display image data according to a third embodiment.

In a third embodiment, the image capturing apparatus 100 executes JPEG encoding on display image data displayed on the image display unit 18. On the basis of the resulting compression ratio, the image capturing apparatus 100 selects a Huffman table that allows JPEG encoding to be executed on image data to be stored in the storage medium 20. The third embodiment will be described with reference to FIG. 9.

When a shutter (not shown) of the image capturing apparatus 100 is released, the process proceeds to S306. Otherwise the process proceeds to S302 (S301).

In S302, the image capturing apparatus 100 acquires display image data from the memory 40 and sends it to the encoding circuit 60. The display image data is acquired through the image sensing device 12 at a predetermined frame rate (for example, 30 frames per second). The display image data is then subjected to image processing by the image processing circuit 30 so that the data can be displayed in the image display unit 18. The data is then stored in the memory 40.

The encoding circuit 60 then executes JPEG encoding on the display image data acquired in S302 (S303)

The system control circuit 90 then calculates the compression ratio α of the JPEG image data obtained in S303 (S304). On the basis of the compression ratio α, the system control circuit 90 selects a Huffman table (S305). A method for selecting a Huffman table according to the third embodiment is similar to that according to the first and second embodiments and will not be described here.

Thus, the operations in S302 to S305 are repeated to update the selected Huffman table until the shutter (not shown) is released.

In S306, image data (CCD-RAW data) captured and stored in the memory 40 is acquired by the memory control circuit 50, which then sends the data to the encoding circuit 60.

The encoding circuit 60 then uses the Huffman table selected in S305 to execute JPEG encoding on the image data acquired in S306. The encoding circuit 60 stores the JPEG image data obtained, in the storage medium 20 via the memory control circuit 50 (S307). In S307, RAW lossless compression may be executed instead of JPEG encoding.

As described above, according to the present embodiment, the image capturing apparatus 100 continuously executes JPEG encoding on display image data acquired at the predetermined frame rate until the shutter (not shown) is released. On the basis of the compression ratio of the JPEG image data obtained, the image capturing apparatus 100 sequentially selects and updates the Huffman table. Once the shutter (not shown) is released, the image capturing apparatus 100 uses the selected Huffman table to execute JPEG encoding on the CCD-RAW data.

In other words, the image capturing apparatus 100 selects a Huffman table on the basis of the compression ratio of the JPEG image data obtained.

Thus, the image capturing apparatus 100 need not repeat trials and errors before determining which Huffman table to use. This makes it possible to relatively efficiently execute JPEG encoding on image data while quickly selecting a Huffman table.

Other Embodiment

The processes of the above embodiments may be executed by providing a system or apparatus with a storage medium in which program codes for software embodying the functions of the embodiments are stored.

The functions of the above embodiments can then be provided by a computer (or CPU or MPU) in the system or apparatus by reading and executing the program codes stored in the storage medium. In this case, the program codes themselves read from the storage medium provide the functions of the above embodiments. The storage medium in which the program codes are stored constitutes the present invention. The storage medium via which the program codes are supplied may be, for example, a floppy (registered trademark) disk, a hard disk, an optical disk, or a magneto optic disk. Alternatively, a CD-ROM, a CD-R, a magnetic tape, a nonvolatile memory card, or a ROM may be used.

The functions of the above embodiments need not necessarily be provided by executing the program codes read by a computer. The functions of the above embodiments may also be provided by an OS (Operating System) or the like operating on the computer, by executing a part or all of the actual process on the basis of instructions in the program codes.

The program codes read from the storage medium may be written to a memory provided in an expanded board inserted into the computer or an expanded unit connected to the computer. The function of the above embodiments may then be provided by a CPU the like installed in the expanded board or unit, by executing a part or all of the actual process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255612, filed on Sep. 2, 2005, and 2006-197372, filed on Jul. 19, 2006, which are hereby incorporated by reference herein in their entirety.

The invention claimed is:

1. An image encoding apparatus comprising:
   input means arranged to input image data;
   first compression encoding means arranged to execute compression encoding on the image data input by said input means by a first encoding method including an orthogonal transform process where the image data is transformed into frequency components;
   second compression encoding means arranged to execute compression encoding on the image data input by said input means by a second encoding method including a predictive encoding process where a differential value between a reference pixel data and a target pixel data in the image data is encoded by a variable-length encoding;
   correlation detection means arranged to detect a degree of correlation between pixels in the image data input by said input means on the basis of a result of the compression encoding by said first compression encoding means; and
   encode parameter determination means arranged to determine an encode parameter for the variable-length encoding of said second compression encoding means according to the degree of correlation detected by said correlation detection means.

2. The image encoding apparatus according to claim 1, wherein the variable-length encoding includes Huffman encoding, and the encode parameter includes a Huffman table for the Huffman encoding.

3. The image encoding apparatus according to claim 2, wherein
   said second compression encoding means executes the Huffman encoding using one of the plurality of Huffman tables including a first Huffman table which assigns a code with shorter code length to the differential value with a smaller absolute value and a second Huffman table which assigns codes with code length insignificantly varying than the codes assigned by the first Huffman table to the differential value with the smaller to the higher absolute value, and said encode parameter determination means determines one of the first Huffman table and the second Huffman table according to the degree of correlation.

4. The image encoding apparatus according to claim 1, wherein said correlation detection means detects the degree of correlation by comparing a compression ratio of the image data encoded by said first compression encoding means with one or more preset thresholds.

5. The image encoding apparatus according to claim 4, wherein a plurality of the thresholds are set in association with the plurality of encode parameters, and said encode parameter determination means determines the encode parameter on the basis of a relationship between a value of the compression ratio and the plurality of thresholds.

6. The image encoding apparatus according to claim 5, wherein
the variable-length encoding includes Huffman encoding,
the plurality of encode parameters include Huffman tables which tend to assign a code with shorter code length to the differential value with a smaller absolute value and in which the tendency becomes insignificant stepwise among the tables, and
the plurality of thresholds correspond to the Huffman tables having the stepwise varying tendency.

7. The image encoding apparatus according to claim 4, wherein
the first encoding method includes a quantization process where the frequency components obtained by the orthogonal transform process are quantized according to one of a plurality of quantization tables and a variable-length encoding process where the frequency components quantized by said quantization process are variable-length encoded, and
the encode parameter determination means varies the one or more preset thresholds according to a quantization table used in the quantization process of the first compression encoding means.

8. The image encoding apparatus according to claim 1, further comprising recording means arranged to record a first image data that is the image data encoded by said first compression encoding means and a second image data that is the image data encoded by said second compression encoding means in a storage medium,
wherein the first image data are used for navigating contents of the second image data.

9. An image encoding apparatus comprising:
input means arranged to input image data;
first compression encoding means arranged to execute compression encoding on the image data input by said input means by a first encoding method including an orthogonal transform process where the image data is transformed into frequency components and a quantization process where the frequency components obtained by the orthogonal transform process are quantized;
second compression encoding means arranged to execute compression encoding on the image data input by said input means by a second encoding method including a predictive encoding process where a differential value between a reference pixel data and a target pixel data in the image data is encoded by a variable-length encoding;
correlation detection means arranged to detect a degree of correlation between pixels in the image data input by said input means on the basis of a result of the compression encoding by said second compression encoding means; and
encode parameter determination means arranged to determine an encode parameter for the quantization process of said first compression encoding means according to the degree of correlation detected by said correlation detection means.

10. The image encoding apparatus according to claim 9, wherein
the first compression encoding means quantizes the frequency components obtained by the orthogonal transform process according to one of a plurality of quantization tables, and
the encode parameter includes the quantization table used in the quantization process.

11. The image encoding apparatus according to claim 10, wherein
the plurality of quantization tables include a first quantization table and a second quantization table with smaller quantization step size than the first quantization table, and
said encode parameter determination means determines one of the first quantization table and the second quantization table according to the degree of correlation.

12. The image encoding apparatus according to claim 9, wherein said correlation detection means detects the degree of correlation by comparing a compression ratio of the image data encoded by said second compression encoding means with one or more preset thresholds.

13. The image encoding apparatus according to claim 12, wherein
a plurality of the thresholds are set in association with the plurality of encode parameters, and
said encode parameter determination means determines the encode parameter on the basis of a relationship between a value of the compression ratio and the plurality of thresholds.

14. The image encoding apparatus according to claim 9, wherein
the first encoding means includes a variable-length encoding process where the frequency components quantized by the quantization process are variable-length encoded according to one of a plurality of Huffman tables, and
said encoding parameter determination means determines one of the plurality of Huffman tables used in the variable-length encoding process according to the degree of the correlation.

15. An image encoding method comprising:
an input step of inputting image data;
a first compression encoding step of executing compression encoding on the image data input in said input step by a first encoding method including an orthogonal transform process where the image data is transformed into frequency components;
a second compression encoding step of executing compression encoding on the image data input in said input step by a second encoding method including a predictive encoding process where a differential value between a reference pixel data and a target pixel data in the image data is encoded by a variable-length encoding;
a correlation detection step of detecting a degree of correlation between pixels in the image data input in said input step on the basis of a result of the compression encoding in said first compression encoding step; and
an encode parameter determination step of determining an encode parameter for the variable-length encoding of said second compression encoding step according to the degree of correlation detected in said correlation detection step.

16. An image encoding method comprising:
   an input step of inputting image data;
   a first compression encoding step of executing compression encoding on the image data input in said input step by a first encoding method including an orthogonal transform process where the image data is transformed into frequency components and a quantization process where the frequency components obtained by the orthogonal transform process are quantized;
   a second compression encoding step of executing compression encoding on the image data input in said input step by a second encoding method including a predictive encoding process where a differential value between a reference pixel data and a target pixel data in the image data is encoded by a variable-length encoding;
   a correlation detection step of detecting a degree of correlation between pixels in the image data input in said input step on the basis of a result of the compression encoding in said second compression encoding step; and
   an encode parameter determination step of determining an encode parameter for the quantization process of said first compression encoding step according to the degree of correlation detected in said correlation detection step.

* * * * *